(12) United States Patent
Gong

(10) Patent No.: US 12,153,304 B2
(45) Date of Patent: Nov. 26, 2024

(54) DISPLAY PANEL AND MANUFACTURING METHOD THEREOF

(71) Applicant: TCL CHINA STAR OPTOELECTRONICS TECHNOLOGY CO., LTD., Shenzhen (CN)

(72) Inventor: Jinhui Gong, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/598,268

(22) PCT Filed: Aug. 23, 2021

(86) PCT No.: PCT/CN2021/114038
§ 371 (c)(1),
(2) Date: Sep. 25, 2021

(87) PCT Pub. No.: WO2023/019605
PCT Pub. Date: Feb. 23, 2023

(65) Prior Publication Data
US 2024/0019733 A1    Jan. 18, 2024

(30) Foreign Application Priority Data
Aug. 18, 2021  (CN) .......................... 202110947965.1

(51) Int. Cl.
G02F 1/1335    (2006.01)
G02F 1/1368    (2006.01)

(52) U.S. Cl.
CPC .. *G02F 1/133514* (2013.01); *G02F 1/133512* (2013.01); *G02F 1/133516* (2013.01); *G02F 1/1368* (2013.01); *G02F 2201/50* (2013.01)

(58) Field of Classification Search
CPC ......... G02F 1/133514; G02F 1/133512; G02F 1/133516; G02F 1/1368; G02F 2201/50
See application file for complete search history.

(56) References Cited

U.S. PATENT DOCUMENTS

2016/0116801 A1    4/2016  Fan, et al.
2018/0006093 A1*   1/2018  Kim ...................... G03F 7/0007
(Continued)

FOREIGN PATENT DOCUMENTS

CN    103278876 A    9/2013
CN    103913884 A    7/2014
(Continued)

OTHER PUBLICATIONS

International Search Report in International application No. PCT/CN2021/114038, mailed on May 17, 2022.
(Continued)

*Primary Examiner* — Jonathan Y Jung
(74) *Attorney, Agent, or Firm* — PV IP PC; Wei Te Chung

(57) ABSTRACT

Disclosed are a display panel and a manufacturing method thereof. The display panel comprises a substrate, a color filter structure layer and a protective layer disposed on the substrate in sequence. The color filter structure layer comprises a plurality of color resist units. The color resist unit comprises a quantum dot color resist and a barrier disposed on the quantum dot color resist. The protective layer covers the color filter structure layer.

13 Claims, 4 Drawing Sheets

(56) References Cited

U.S. PATENT DOCUMENTS

| | | | | |
|---|---|---|---|---|
| 2018/0120647 A1* | 5/2018 | Suh | ................... | G02F 1/133707 |
| 2018/0129094 A1* | 5/2018 | Kim | ................... | G02F 1/133617 |
| 2019/0371866 A1* | 12/2019 | Kim | ..................... | H10K 59/879 |
| 2020/0185638 A1* | 6/2020 | Choi | ................... | H10K 59/122 |

FOREIGN PATENT DOCUMENTS

| | | |
|---|---|---|
| CN | 105242442 A | 1/2016 |
| CN | 108663853 A | 10/2018 |
| CN | 108919557 A | 11/2018 |
| CN | 210005827 U | 1/2020 |
| CN | 111279230 A | 6/2020 |
| CN | 112946946 A | 6/2021 |
| JP | 2005134879 A | 5/2005 |

OTHER PUBLICATIONS

Written Opinion of the International Search Authority in International application No. PCT/CN2021/114038, mailed on May 17, 2022.

Chinese Office Action issued in corresponding Chinese Patent Application No. 202110947965.1 dated Jul. 28, 2022, pp. 1-8.

\* cited by examiner

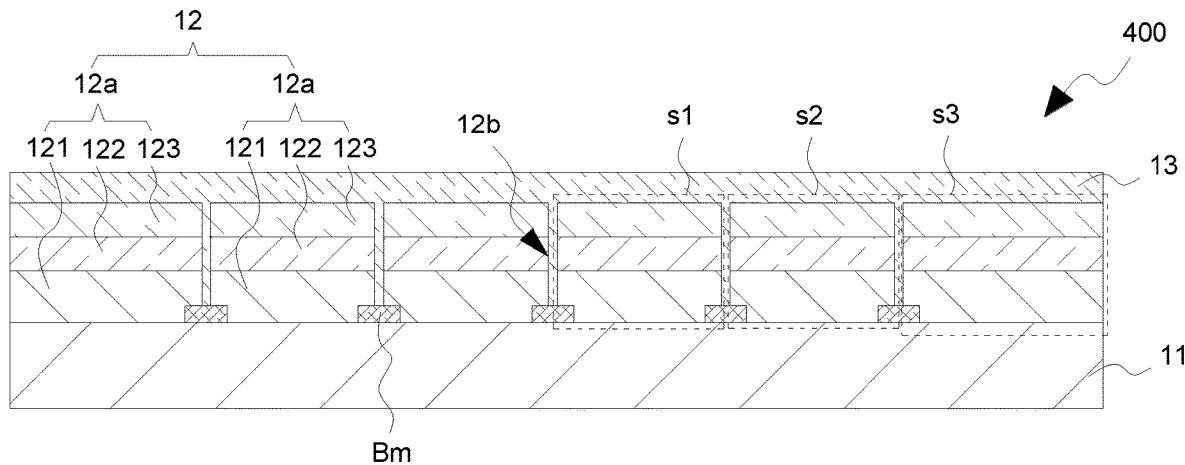
FIG. 4
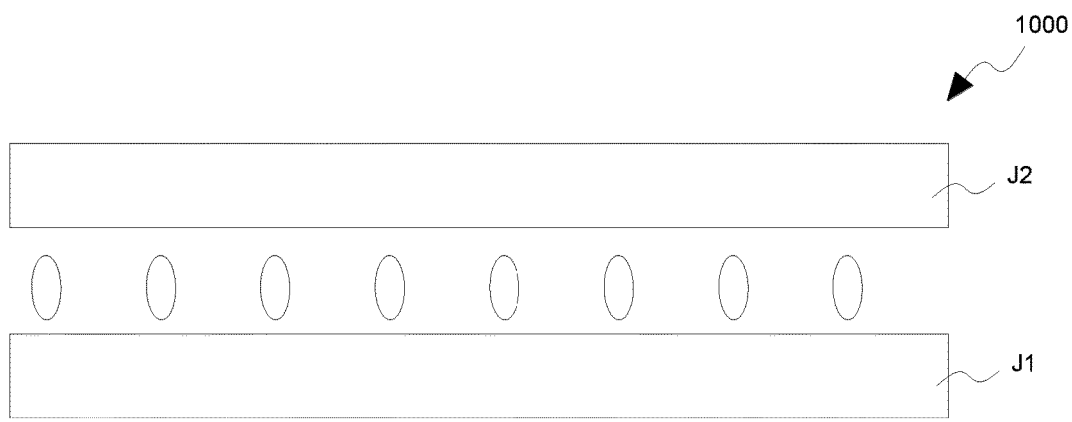
FIG. 5
```
forming a color filter structure layer on the substrate, and the color
filter structure layer comprises a plurality of color resist units, and     B1
the color resist unit comprises a quantum dot color resist and a
barrier disposed on the quantum dot color resist
```
↓
```
forming a protective layer on the color filter    B2
structure layer
```
FIG. 6

DISPLAY PANEL AND MANUFACTURING METHOD THEREOF

RELATED APPLICATIONS

This application is a Notional Phase of PCT Patent Application No. PCT/CN2021/114038 having international filing date of Aug. 23, 2021, which claims the benefit of priority of Chinese Patent Application No. 202110947965.1 filed on Aug. 18, 2021. The contents of the above applications are all incorporated by reference as if fully set forth herein in their entirety.

FIELD OF THE INVENTION

The present application relates to a display technology field, and more particularly to a display panel and a manufacturing method thereof.

BACKGROUND OF THE INVENTION

In research and practice of the prior art, the inventor of the present application found that quantum dots are easily corroded by solvents and become invalid during the etching and patterning process, and the method of preparing color film by inkjet printing has problems, that the precision control is difficult, and the quantum dot film layer is uniform and efficiency is low; the patterned quantum dot film possesses poor stability and requires strict packaging protection, however, the coating and packaging protection is generally carried out in a high-temperature environment, which easily damages the performance of the quantum dots.

SUMMARY OF THE INVENTION

The embodiments of the present application provide a display panel and a manufacturing method thereof, which can reduce the risk of poor stability of quantum dots.

The embodiment of the present application provides a display panel, comprising:

a substrate;

a color filter structure layer disposed on the substrate, and the color filter structure layer comprises a plurality of color resist units, and the color resist unit comprises a quantum dot color resist and a barrier disposed on the quantum dot color resist.

Optionally, in some embodiments of the present application, the color resist unit further comprises a light-transmissive photoresist body, and the photoresist body is disposed on the barrier.

Optionally, in some embodiments of the present application, the display panel further comprises a protective layer, and the protective layer covers the color filter structure layer.

Optionally, in some embodiments of the present application, a gap exists between the color resist units, and the gap is located between at least two adjacent barriers, and the protective layer is filled in the gap.

Optionally, in some embodiments of the present application, a material of the barrier comprises at least one of aluminum oxide, zinc oxide, gallium nitride, aluminum nitride and magnesium oxide; a material of the protective layer comprises at least one of aluminum oxide, zinc oxide, gallium nitride, aluminum nitride and magnesium oxide.

Optionally, in some embodiments of the present application, the display panel further comprises a light-shielding layer disposed on the substrate, and the light-shielding layer is disposed between two adjacent color resist units.

Optionally, in some embodiments of the present application, the display panel further comprises a thin film transistor layer disposed on the substrate, and the color filter structure layer is disposed on the thin film transistor layer.

Correspondingly, the embodiment of the present application further provides a manufacturing method of a display panel, including steps of:

forming a color filter structure layer on the substrate, and the color filter structure layer comprises a plurality of color resist units, and the color resist unit comprises a quantum dot color resist and a barrier disposed on the quantum dot color resist;

forming a protective layer on the color filter structure layer.

Optionally, in some embodiments of the present application, the plurality of color resist units comprises a first color resist unit and a second color resist unit, and the step of forming the color filter structure layer on the substrate comprises steps of:

forming the first color resist unit on the substrate;

forming the second color resist unit on the substrate;

wherein the step of forming the first color resist unit on the substrate comprises steps of:

forming a quantum dot material layer on the substrate;

forming a barrier material layer on the quantum dot material layer;

forming a patterned photoresist layer on the barrier material layer;

removing a part of the barrier material layer and a part of the quantum dot material layer that are not covered by the photoresist layer.

Optionally, in some embodiments of the present application, after the step of removing the part of the barrier material layer and the part of the quantum dot material layer that are not covered by the photoresist layer, the manufacturing method further comprises a step of:

removing the photoresist layer.

Optionally, in some embodiments of the present application, the step of forming a barrier material layer on the quantum dot material layer comprises a step of:

employing an atomic layer deposition process to deposit the barrier material layer on the quantum dot material layer at a set temperature, and the set temperature is less than or equal to 60 degrees Celsius.

Optionally, in some embodiments of the present application, the manufacturing method further comprises a step of:

forming a protective layer on the color filter structure layer.

Optionally, in some embodiments of the present application, the step of forming a barrier material layer on the quantum dot material layer comprises a step of:

introducing trimethylaluminum into a chamber for a first set time, and the first set time is between 0.01 second and 0.1 second;

introducing inert gas for purging for a second set time, and the second set time is between 20 seconds and 180 seconds;

introducing oxygen plasma into the chamber for a third set time, and the third set time is between 30 seconds and 180 seconds;

introducing the inert gas for purging again for a fourth set time, and the fourth set time is between 20 seconds and 180 seconds;

repeating the aforesaid steps for a set number of times, and the set number of times is between 50 times and 100 times.

Optionally, in some embodiments of the present application, the step of forming a barrier material layer on the quantum dot material layer comprises a step of:

introducing trimethylaluminum into a chamber for a first set time, and the first set time is between 0.01 second and 0.1 second;

introducing inert gas for purging for a second set time, and the second set time is between 20 seconds and 180 seconds;

repeating the aforesaid steps for a first set number of times, and the first set number of times is between 8 times and 15 times;

introducing $H_2O$ into the chamber for a third set time, and the third set time is between 0.01 second and 0.1 second;

introducing the inert gas for purging again for a fourth set time, and the fourth set time is between 20 seconds and 180 seconds;

repeating the aforesaid steps for a set number of times, and the set number of times is between 50 times and 100 times.

Optionally, in some embodiments of the present application, a gap exists between any two adjacent color resist units, and the gap is located between at least two adjacent barriers, and the protective layer covers the color filter structure layer and is filled in the gap.

Optionally, in some embodiments of the present application, the step of forming the protective layer on the color filter structure layer comprises a step of:

employing an atomic layer deposition process to deposit the barrier material layer on the quantum dot material layer at a set temperature, and the set temperature is less than or equal to 60 degrees Celsius.

Optionally, in some embodiments of the present application, before the step of forming the color filter structure layer on the substrate, the manufacturing method further comprises a step of:

forming a light-shielding layer on the substrate.

Optionally, in some embodiments of the present application, before the step of forming the color filter structure layer on the substrate, the manufacturing method further comprises a step of:

forming a thin film transistor layer on the substrate.

Optionally, in some embodiments of the present application, a material of the barrier comprises at least one of aluminum oxide, zinc oxide, gallium nitride, aluminum nitride and magnesium oxide; a material of the protective layer comprises at least one of aluminum oxide, zinc oxide, gallium nitride, aluminum nitride and magnesium oxide.

The display panel according to the embodiment of the present application comprises a substrate, a color filter structure layer and a protective layer disposed on the substrate in sequence. The color filter structure layer comprises a plurality of color resist units. The color resist unit comprises a quantum dot color resist and a barrier disposed on the quantum dot color resist. In the present application, the barrier is employed to cover the quantum dot color resist. When the photoresist layer is stripped and/or the quantum dot material layer is etched, the risk of the stripping liquid and/or etching material damaging the quantum dot (quantum dot color resist) that needs to be retained is reduced.

Besides, the display panel of this embodiment further comprises a protective layer. The protective layer covers the color filter structure layer to prevent water and oxygen from invading the quantum dot color resist.

BRIEF DESCRIPTION OF THE DRAWINGS

In order to more clearly illustrate the embodiments of the present application, the following figures will be described in the embodiments are briefly introduced. It is obvious that the drawings are only some embodiments of the present application, those of ordinary skill in this field can obtain other figures according to these figures without paying the premise.

FIG. 4 is a schematic structural diagram of a display panel provided by the fourth embodiment of the present application;

FIG. 5 is a schematic structural diagram of a display panel provided by an embodiment of the present application;

FIG. 6 is a flowchart of a manufacturing method of a display panel provided by an embodiment of the present application;

DETAILED DESCRIPTION OF PREFERRED EMBODIMENTS

Figure 1:
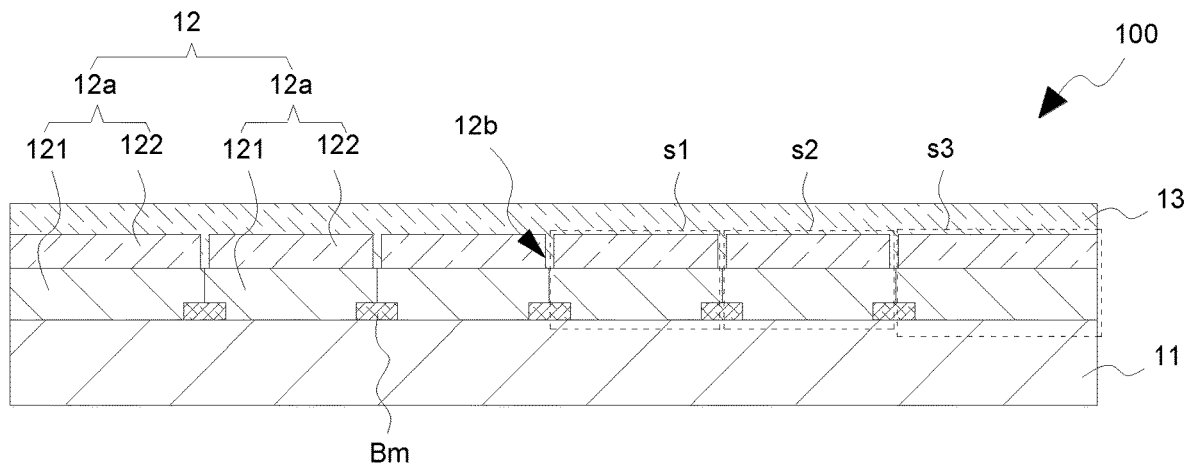
FIG. 1 is a schematic structural diagram of a display panel provided by the first embodiment of the present application.

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of skilled in the premise of no creative efforts obtained, should be considered within the scope of protection of the present application. Besides, it should be understood that the specific embodiments described herein are merely for illustrating and explaining the present application and are not intended to limit the present application. In this application, if no explanation is made to the contrary, the orientation words used such as "upper", "lower", "left", "right" usually refer to the upper, lower, left and right of the device in actual use or working state, which specifically are the directions of the drawing in the figures.

The embodiment of the present application provides a display panel and a manufacturing method thereof. The detail descriptions are introduced below. It should be noted that the order of description in the following embodiments is not meant to limit the preferred order of the embodiments.

Please refer to FIG. 1. The first embodiment of the present application provides a display panel 100 which comprises a substrate 11 and a color filter structure layer 12.

The color filter structure layer 12 is disposed on the substrate 11. The color filter structure layer 12 comprises a plurality of color resist units 12a. The color resist unit 12a comprises a quantum dot color resist 121 and a barrier 122 disposed on the quantum dot color resist 121. In the display panel 100 according to the first embodiment of the present application, the barrier 122 is employed to cover the quantum dot color resist 121. When the photoresist layer is stripped and/or the quantum dot material layer is etched, the risk of the stripping liquid and/or etching material damaging the quantum dot (quantum dot color resist) that needs to be retained is reduced. The quantum dot that needs to be retained is the quantum dot color resist 121.

Specifically, after coating the quantum dot material layer, a barrier material layer and a photoresist layer are formed on the quantum dot material layer, and then the photoresist layer is patterned; then the patterned photoresist layer is employed as a mask to form the quantum dot color resist 121 and the barrier 122. In the process of forming the quantum dot color resist 121, a wet etching or dry etching process is generally used, and the barrier 122 reduces the risk of quantum dot being damaged; subsequently, the photoresist layer is stripped, and the stripping liquid is blocked by the barrier 122 during the process of stripping the photoresist layer, thereby reducing the risk of the quantum dot being damaged by the stripping liquid.

On the other hand, the barrier 122 covers the quantum dot color resist 121, and also functions to isolate the ambient atmosphere from contacting the quantum dot color resist 121, thereby improving the stability of the quantum dot color resist 121.

The display panel 100 of this embodiment further comprises a protective layer 13. The protective layer 13 covers the color filter structure layer 12, which functions to isolate the ambient atmosphere, reduces the contact risk between the ambient atmosphere and the quantum dot color resist 121, thereby improving the stability of the quantum dot color resist 121.

Optionally, there is a gap 12b between the color resist units 12a. The gap 12b is located between two adjacent barriers 122, and the protective layer 13 is filled in the gap 12b.

Optionally, the barrier 122 may be a dense metal oxide film or a metal nitride film. For instance, the material of the barrier 122 comprises at least one of aluminum oxide, zinc oxide, gallium nitride, aluminum nitride and magnesium oxide.

Optionally, the barrier 122 may be a composite film structure, that is, the barrier 122 is formed by stacking at least two layers of inorganic films.

Optionally, the plurality of color resist units 12a comprises a first color resist unit s1, a second color resist unit s2, and a third color resist unit s3. The colors of the quantum dot material layer 121 in the first color resist unit s1, the second color resist unit s2, and the third color resist unit s3 are different from one another. For instance, the quantum dot color resist of the first color resist unit s1 is red quantum dot resist; the quantum dot color resist of the second color resist unit s2 is green quantum dot resist; the quantum dot color resist of the third color resist unit s3 is blue quantum dot resist. For another instance, the quantum dot color resist of the first color resist unit s1 is green quantum dot resist; the quantum dot color resist of the second color resist unit s2 is blue quantum dot resist; the quantum dot color resist of the third color resist unit s3 is red quantum dot resist.

The materials of the barriers 122 in the first color resist unit s1, the second color resist unit s2, and the third color resist unit s3 may be the same or different.

Optionally, the material of the protective layer 13 may be a dense metal oxide film or a metal nitride film; for instance, the material of the protective layer 13 may comprise at least one of aluminum oxide, zinc oxide, gallium nitride, aluminum nitride and magnesium oxide.

Optionally, the substrate 11 may be a rigid substrate or a flexible substrate. The material of the substrate 11 comprises one of polyethylene, polypropylene, polystyrene, polylactic acid, polyethylene terephthalate, polyimide and polyurethane.

Optionally, the display panel 100 further comprises a light-shielding layer Bm disposed on the substrate 11. The light-shielding layer Bm is disposed between two adjacent color resist units 12a. Namely, the display panel 100 comprises a color filter substrate, and the color filter substrate comprises the aforesaid structural features.

Optionally, the material of the light-shielding layer 14 can be inorganic metal materials, such as Cr (chromium), Mo (molybdenum), Mn (manganese), etc., or metal oxide materials, such as $CrO_x$, $MoO_x$, $MnO_2$, etc., or a mixed film layer formed of metal and metal oxide; or can also be organic black resin material, such as black polystyrene, black photoresist, etc.

Figure 2:
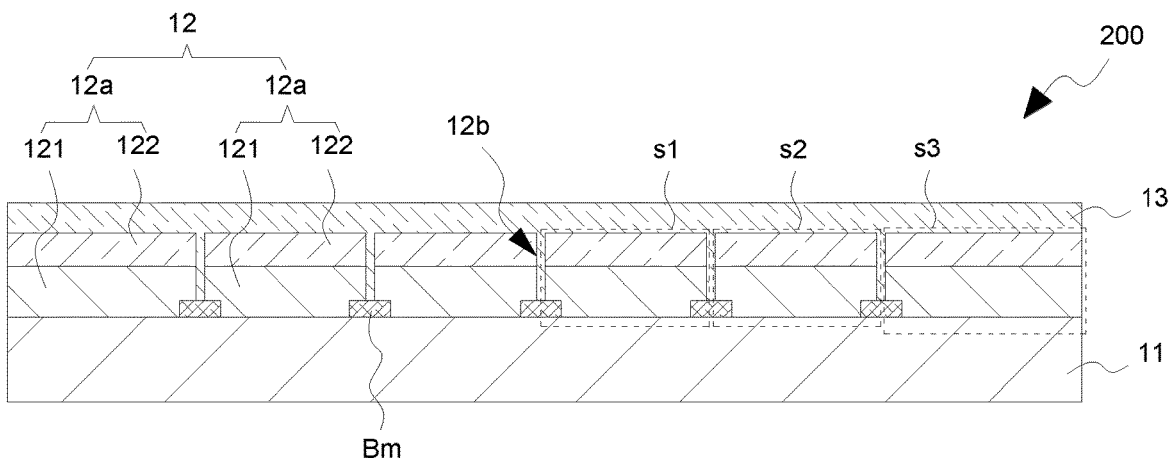
FIG. 2 is a schematic structural diagram of a display panel provided by the second embodiment of the present application.

Please refer to FIG. 2. The display panel 200 of the second embodiment comprises a substrate 11, a color filter structure layer 12 and a protective layer 13.

The color filter structure layer 12 is disposed on the substrate 11. The color filter structure layer 12 comprises a plurality of color resist units 12a. The color resist unit 12a comprises a quantum dot color resist 121 and a barrier 122 disposed on the quantum dot color resist 121. The protective layer 13 covers the color filter structure layer 12.

The difference between the display panel 200 of the second embodiment and the display panel 100 of the first embodiment is that there is a gap 12b between the color resist units 12a. The gap 12b is located between at least two adjacent barriers 122. The gap 12b penetrates the barrier 122 and the quantum dot color resistor 121.

The gap 12b penetrates the barrier 122 and the quantum dot color resistor 121, so that the color resist units 12a are separated from each other. Then, the protective layer 13 covers the color filter structure layer 12 and fills the gap 12b, so that each color resist unit 12a is independently covered by the protective layer 13.

When the quantum dot color resist 121 of a certain color resist unit 12a is invaded by water and oxygen, since the color resist unit 12a possesses the characteristic of being independently covered, other color resist units 12a are not affected, and the other color resist units 12a are better protected.

Optionally, the width of the gap 12b increases from the side close to the substrate 11 to the side away from the substrate 11, so that the protective layer 13 smoothly covers the sidewalls of the gap 12b, and the sealing property of the protective layer 13 in filling the gap 12b is improved.

Figure 3:
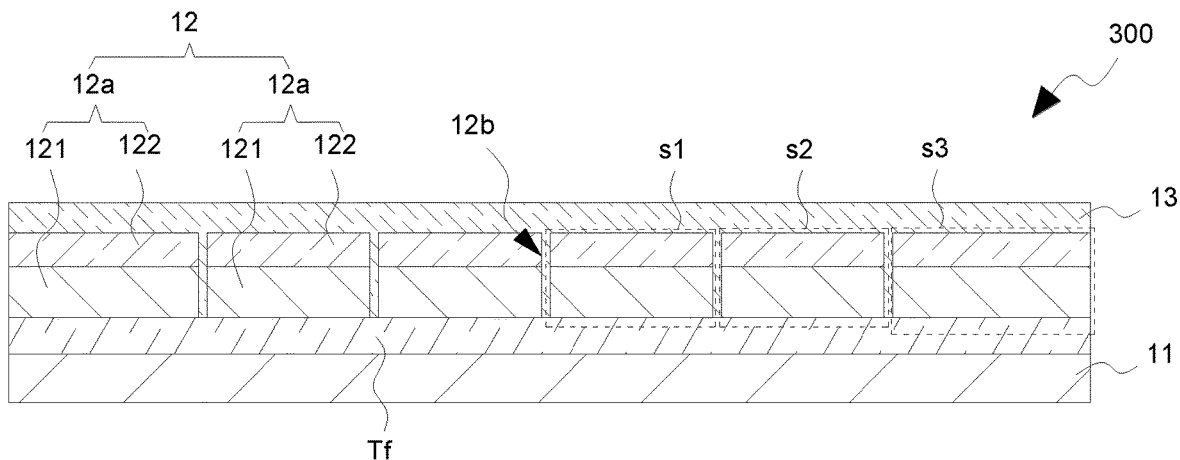
FIG. 3 is a schematic structural diagram of a display panel provided by the third embodiment of the present application.

Please refer to FIG. 3. The display panel 300 of the second embodiment comprises a substrate 11, a color filter structure layer 12 and a protective layer 13.

The color filter structure layer 12 is disposed on the substrate 11. The color filter structure layer 12 comprises a plurality of color resist units 12a. The color resist unit 12a comprises a quantum dot color resist 121 and a barrier 122 disposed on the quantum dot color resist 121. The protective layer 13 covers the color filter structure layer 12.

The difference of the display panel 300 of the third embodiment from the display panel 100 of the first embodiment and the display panel 200 of the second embodiment is that the display panel 300 comprises an array substrate. The array substrate of the display panel 300 further comprises a thin film transistor layer Tf disposed on the substrate 11. The color filter structure layer 12 is disposed on the thin film transistor layer Tf.

The thin film transistor layer Tf comprises a first metal layer, a first insulating layer, an active layer, a second metal layer, and a second insulating layer. The first metal layer comprises a gate electrode and a scan line, and the second metal layer comprises a source electrode, a drain electrode and a data line.

Please refer to FIG. 4. The difference of the display panel 400 of the fourth embodiment from the display panel 100 of the first embodiment, the display panel 200 of the second embodiment and the display panel 300 of the third embodiment is that the color resist unit 12a further comprises a light-transmissive photoresist body 123. The photoresist body 123 is disposed on the barrier 122. The protective layer 13 covers the photoresist body 123. The photoresist body 123 is a negative photoresist.

It should be noted that the display panel 400 of the fourth embodiment is described based on the display panel 200 of the second embodiment, but it is not limited thereto. For example, it can also be based on the display panel 100 of the first embodiment. Namely, in the display panel 400 of the fourth embodiment, on the basis of the display panel 100 of the first embodiment or the display panel 200 of the second embodiment, a photoresist body 123 is further provided.

In the display panel 400 of the fourth embodiment, the photoresist body 123 is retained during the process of manufacturing the display panel 400, that is, the step of stripping the photoresist body 123 with stripping liquid is omitted, thus the risk of the stripping liquid damaging the quantum dot color resists 121 is avoided.

Correspondingly, please refer to FIG. 5. The embodiment of the present application further provides a display panel 1000, comprising an opposite substrate J1 and a display substrate J2. The display substrate J2 is disposed opposite to the opposite substrate J1. Liquid crystal is disposed between the display substrate J2 and the opposite substrate J1.

The structure of the display substrate J2 is the same as or similar to the structure of the color filter substrate or the array substrate of the display panel (100/200/300/400) of the foregoing embodiment. Therefore, the structure of the display substrate J2 can refer to the above description about the display panel (100/200/300/400).

When the display substrate J2 is used as a color filter substrate, the opposite substrate J1 is used as an array substrate; when the display substrate J2 is used as an array substrate, the opposite substrate J1 is used as an unconventional color filter substrate.

Correspondingly, please refer to FIG. 6. The embodiment of the present application further provides a manufacturing method of a display panel, including steps of:

Step B1: forming a color filter structure layer on the substrate, and the color filter structure layer comprises a plurality of color resist units, and the color resist unit comprises a quantum dot color resist and a barrier disposed on the quantum dot color resist;

Step B2: forming a protective layer on the color filter structure layer. In the manufacturing method of the display panel according to the embodiment of the present application, the barrier is formed on the quantum dot color resist. When the photoresist layer is stripped and/or the quantum dot material layer is etched, the risk of the stripping liquid and/or etching material damaging the quantum dot is reduced. The protective layer is formed on the color filter structure layer, which functions to isolate the ambient atmosphere, reduces the contact risk between the ambient atmosphere and the quantum dot color resist, thereby improving the stability of the quantum dot color resist.

The manufacturing method of the display panel according to the embodiment of the present application will be described below.

Step B1: forming a color filter structure layer 12 on the substrate 11. The color filter structure layer 12 comprises a plurality of color resist units 12a. The color resist unit 12a comprises a quantum dot color resist 121 and a barrier 122 disposed on the quantum dot color resist 121.

Optionally, the manufacturing method comprises a step of forming a light-shielding layer Bm on the substrate 11 before Step B1.

In some embodiment, the manufacturing method further comprises a step of: forming a thin film transistor layer on the substrate 11 before Step B1.

The manufacturing method of the display panel 100 of the embodiment of the present application is described with forming the light-shielding layer Bm on the substrate 11 before Step B1 as an illustration, but it is not limited thereto.

Optionally, the plurality of color resist units 12a comprises a first color resist unit s1 and a second color resist unit s2.

Optionally, the plurality of color resist units 12a further comprises a third color resist unit s3.

Step B1 comprises steps of:

Step B11: forming the first color resist unit s1 on the substrate 11;

Step B12: forming the second color resist unit s2 on the substrate 11;

Step B13: forming the third color resist unit s3 on the substrate 11.

Figure 7:
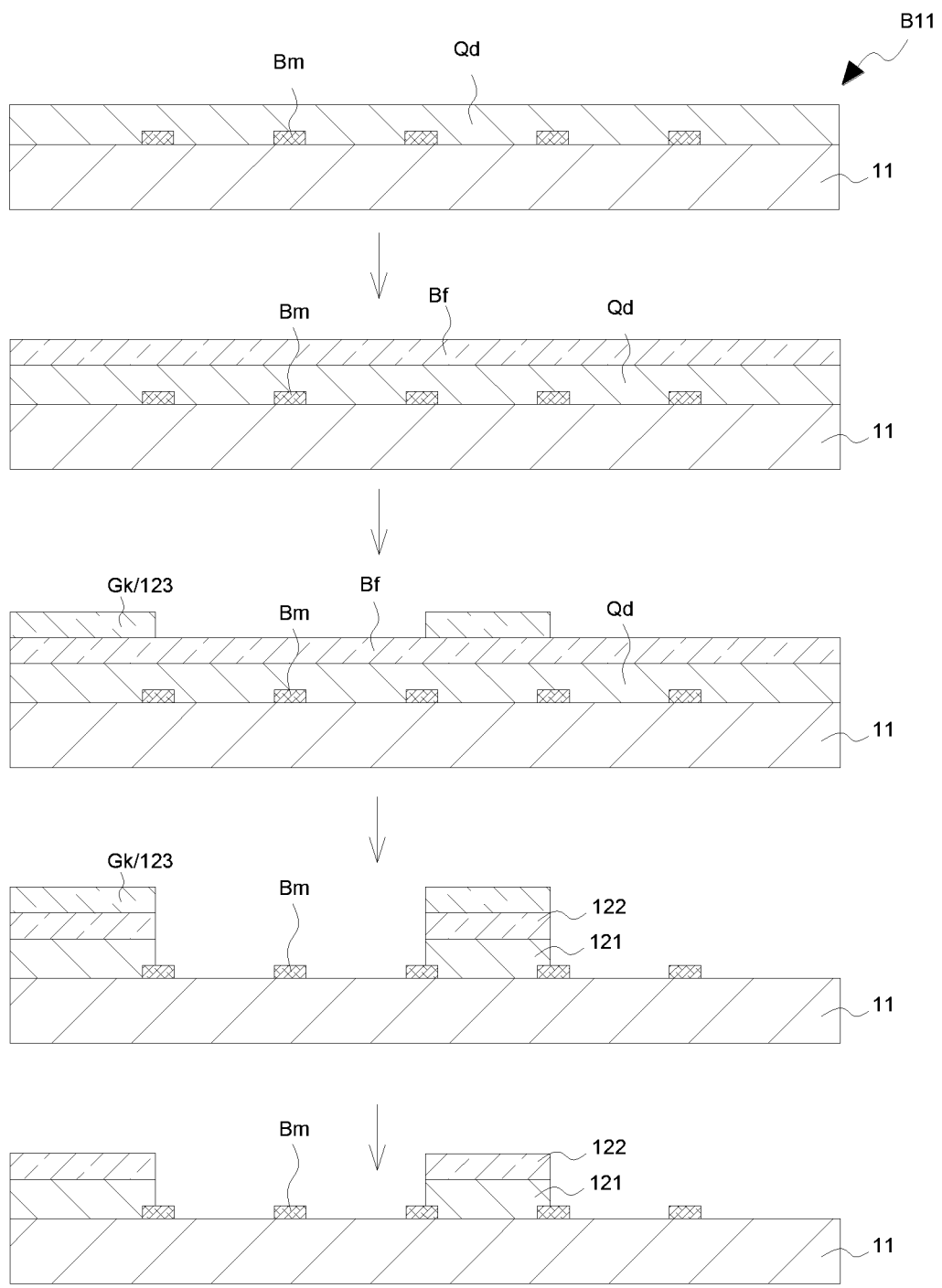
FIG. 7 is a flowchart of Step B11 in a manufacturing method of a display panel provided by an embodiment of the present application.

Please refer to FIG. 7. Step B11 comprises steps of:

Step B101: forming a quantum dot material layer Qd on the substrate 11. The quantum dot material layer Qd is coated on the substrate 11. Then, it goes to Step B102.

Optionally, the substrate 11 may be a rigid substrate or a flexible substrate. The material of the substrate 11 comprises one of polyethylene, polypropylene, polystyrene, polylactic acid, polyethylene terephthalate, polyimide and polyurethane.

Step B102: forming a barrier material layer Bf on the quantum dot material layer Qd.

Optionally, Step B102 comprises a step of: employing an atomic layer deposition process to deposit the barrier material layer Bf on the quantum dot material layer Qd at a set temperature. The set temperature is less than or equal to 60 degrees Celsius. For example, it can be 60 degrees Celsius, 55 degrees Celsius, 50 degrees Celsius, 45 degrees Celsius, 40 degrees Celsius, 35 degrees Celsius, 30 degrees Celsius and 25 degrees Celsius.

At the set temperature less than or equal to 60 degrees Celsius, depositing the barrier material layer Bf possesses the effect of protecting the performance of the quantum dots, because the low-temperature environment will not damage the performance of the quantum dots.

Optionally, in the atomic layer deposition system at the low-temperature setting, Step B102 comprises:

Step B1021: introducing trimethylaluminum into a chamber for a first set time. The first set time is between 0.01 second and 0.1 second, such as 0.01 second, 0.02 seconds, 0.03 seconds, 0.04 seconds, 0.05 seconds, 0.06 seconds, 0.07 seconds, 0.08 seconds, 0.09 seconds and 0.1 second.

Step B1022: introducing inert gas for purging for a second set time, and the second set time is between 20 seconds and 180 seconds, such as 20 seconds, 40 seconds, 60 seconds, 80 seconds, 100 seconds, 120 seconds, 140 seconds, 160 seconds and 180 seconds.

Step B1023: introducing oxygen plasma into the chamber for a third set time, and the third set time is between 30 seconds and 180 seconds, such as 30 seconds, 45 seconds, 60 seconds, 80 seconds, 100 seconds, 125 seconds, 150 seconds and 180 seconds.

Step B1024: introducing the inert gas for purging again for a fourth set time. The fourth set time is between 20 seconds and 180 seconds, such as 20 seconds, 40 seconds, 60 seconds, 80 seconds, 100 seconds, 120 seconds, 140 seconds, 160 seconds and 180 seconds.

Step B1025: repeating the aforesaid steps (Step B1021-Step B1024) for a set number of times. The set number of times is between 50 times and 100 times, such as 50 times, 60 times, 70 times, 80 times, 90 times and 100 times. Then, it goes to Step B103.

According to the process of preparing the barrier material layer Bf, it is prepared by the plasma enhanced atomic layer deposition system (PE-ALD). The plasma-enhanced atomic layer deposition process can be implemented at the set temperature of low temperature, which possesses the effect of protecting the performance of quantum dots.

Besides, in this embodiment, the first set time, the second set time, the third set time, and the fourth set time are coordinated to form a stable and uniform barrier material layer Bf. The setting of the set times can be adjusted according to actual requirements. For instance, if the required thickness of the barrier material layer Bf is large, the set times should be appropriately increased.

In some embodiments, the barrier material layer Bf may also be prepared by a conventional atomic layer deposition system (ALD). Optionally, in the atomic layer deposition system at the low-temperature setting, Step B102 may comprise:

Step B102a: introducing trimethylaluminum into a chamber for a first set time. The first set time is between 0.01 second and 0.1 second, such as 0.01 second, 0.02 seconds, 0.03 seconds, 0.04 seconds, 0.05 seconds, 0.06 seconds, 0.07 seconds, 0.08 seconds, 0.09 seconds and 0.1 second.

Step B102b: introducing inert gas for purging for a second set time, and the second set time is between 20 seconds and 180 seconds, such as 20 seconds, 40 seconds, 60 seconds, 80 seconds, 100 seconds, 120 seconds, 140 seconds, 160 seconds and 180 seconds.

Step B102c: repeating the aforesaid steps (Step B102a-Step B102b) for a first set number of times. The first set number of times is between 8 times and 15 times, such as 8 times, 9 times, 10 times, 11 times, 12 times, 13 times, 14 times and 15 times.

Step B102d: introducing $H_2O$ into the chamber for a third set time. The third set time is between 0.01 second and 0.1 second, such as 0.01 second, 0.02 seconds, 0.03 seconds, 0.04 seconds, 0.05 seconds, 0.06 seconds, 0.07 seconds, 0.08 seconds, 0.09 seconds and 0.1 second.

Step B102e: introducing inert gas for purging for a fourth set time, and the fourth set time is between 20 seconds and 180 seconds, such as 20 seconds, 40 seconds, 60 seconds, 80 seconds, 100 seconds, 120 seconds, 140 seconds, 160 seconds and 180 seconds.

Step B102f: repeating the aforesaid steps (Step B102a-Step B102e) for a set number of times. The set number of times is between 50 times and 100 times, such as 50 times, 60 times, 70 times, 80 times, 90 times and 100 times. Then, it goes to Step B103.

First, Step B102a-Step B102c are proceeded, so that the substrate 11 has enough trimethylaluminum to react with the subsequent $H_2O$, reducing the risk of $H_2O$ entering the quantum dot material layer Qd, thereby ensuring the performance of the quantum material layer Qd.

Besides, in this embodiment, the first set time, the second set time, the third set time, and the fourth set time are coordinated to form a stable and uniform barrier material layer Bf. The setting of the second set times can be adjusted according to actual requirements. For instance, if the required thickness of the barrier material layer Bf is large, the set times should be appropriately increased.

Step B103: forming a patterned photoresist layer Bk on the barrier material layer Bf.

Optionally, Step B103 comprises steps of: first, coating a positive photoresist layer Gk on the barrier material layer Bf; second, employing ultraviolet light to expose the corresponding area of the quantum dot material layer Qd to be removed through a mask, so as to transfer the pattern of the mask on the photoresist layer Gk; third, performing a development process on the exposed photoresist layer Gk, leaving the part of the photoresist layer Gk that is not irradiated, wherein after the positive photoresist layer Gk is irradiated by ultraviolet light, the photosensitizer is decomposed, the amino group coupling degree is low, the alkali resistance is low, and it is easily dissolved by the lye, thereby retaining the photoresist that is not irradiated. The retained photoresist layer Gk is the photoresist body 123. Then, it goes to Step B104.

Optionally, Step B103 may comprise steps of: first, coating a negative photoresist layer Gk on the barrier material layer Bf; second, employing ultraviolet light to expose the corresponding area of the quantum dot material layer Qd to be retained through a mask, so as to transfer the pattern of the mask on the photoresist layer Gk; third, performing a development process on the exposed photoresist layer Gk, wherein the photoresist layer Gk irradiated by the light is not easy to react with the developing solution, and the part of the photoresist layer Gk irradiated by the light is retained. The retained photoresist layer Gk is the photoresist body 123. Then, it goes to Step B104.

Step B104: removing a part of the barrier material layer Bf and a part of the quantum dot material layer Qd that are not covered by the photoresist layer Gk. Then, it goes to Step B105.

Optionally, dry etching or wet etching can be employed to remove the part of the barrier material layer Bf and the part of the quantum dot material layer Qd that are not covered by the photoresist layer Gk, thus to form the quantum dot color resist 121 and the barrier 122.

Since the barrier 122 is formed before the quantum dot color resist 121, during the etching process of the quantum dot material layer Qd, the barrier 122 also functions to protect the quantum dot material layer Qd corresponding to thereto. The risk of etching material damaging the quantum dot color resist 121.

Step B105: removing the photoresist layer Gk. A stripping solution is employed to remove the photoresist layer Gk. Since the barrier 122 is disposed on the quantum dot color resist 121, during the stripping process of the photoresist layer Gk, the risk of etching material damaging the quantum dot color resist 121.

Then, it goes to Step B12.

Figure 8:
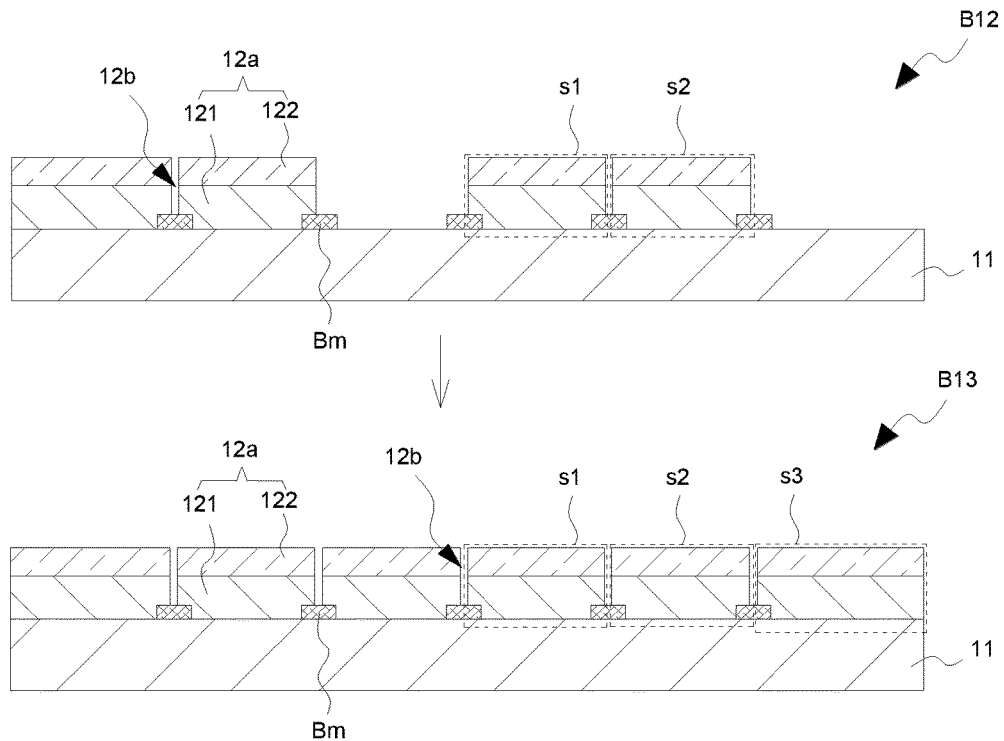
FIG. 8 is a flowchart of Step B12 and Step B13 in a manufacturing method of a display panel provided by an embodiment of the present application.

Please refer to FIG. 8, Step B12: forming the second color resist unit s2 on the substrate 11. Step B12 is the same as or similar to Step B11, except that the colors of the quantum dot color resist 121 formed in Step B12 and Step B11 are different. Then, it goes to Step B13.

Please refer to FIG. 8, Step B13: forming the third color resist unit s3 on the substrate 11. Step B13 is the same as or similar to Step B11, except that the colors of the quantum dot color resist 121 formed in Step B13, Step B11 and Step B12 are different. Then, it goes to Step B2.

Figure 9:
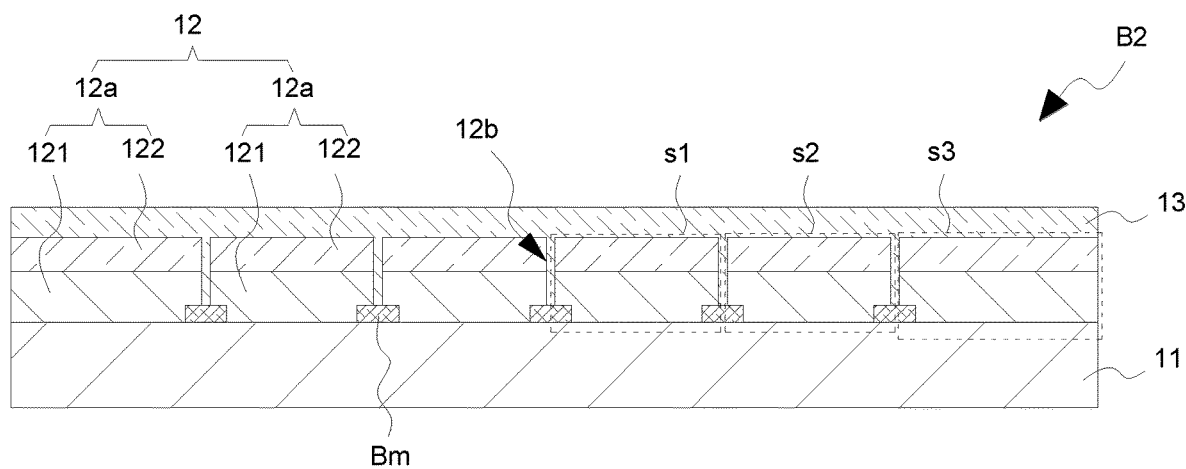
FIG. 9 is a flowchart of Step B2 in a manufacturing method of a display panel provided by an embodiment of the present application.

Please refer to FIG. 9, Step B2: forming a protective layer 13 on the color filter structure layer 12.

In the first color resist unit s1, the second color resist unit s2, and the third color resist unit s3, there is a gap 12b between any two adjacent color resist units 12a. The gap 12b is located between at least two adjacent barriers 122. The protective layer 13 covers the color filter structure layer 12 and is filled in the gap 12b.

Optionally, the gap 12b penetrates the barrier 122 and the quantum dot color resistor 121, so that the color resist units 12a are separated from each other. Then, the protective layer 13 covers the color filter structure layer 12 and fills the gap 12b, so that each color resist unit 12a is independently covered by the protective layer 13.

When the quantum dot color resist 121 of a certain color resist unit 12a is invaded by water and oxygen, since the color resist unit 12a possesses the characteristic of being independently covered, other color resist units 12a are not affected, and the other color resist units 12a are better protected.

Optionally, the width of the gap 12b increases from the side close to the substrate 11 to the side away from the substrate 11, so that the protective layer 13 smoothly covers the sidewalls of the gap 12b, and the sealing property of the protective layer 13 in filling the gap 12b is improved.

In some embodiments, the gap 12b may also be located only between two adjacent barriers 122, as shown in FIG. 1.

Optionally, Step B2 comprises a step of: employing an atomic layer deposition process to deposit the protective layer 13 on the color filter structure layer 12 at a set temperature. The set temperature is less than or equal to 60 degrees Celsius. For example, it can be 60 degrees Celsius, 55 degrees Celsius, 50 degrees Celsius, 45 degrees Celsius, 40 degrees Celsius, 35 degrees Celsius, 30 degrees Celsius and 25 degrees Celsius.

At the set temperature less than or equal to 60 degrees Celsius, depositing the protective layer 13 possesses the effect of protecting the performance of the quantum dots, because the low-temperature environment will not damage the performance of the quantum dots.

Optionally, in the atomic layer deposition system at the low-temperature setting, Step B2 comprises:

Step B21: introducing trimethylaluminum into a chamber for a first set time. The first set time is between 0.01 second and 0.1 second, such as 0.01 second, 0.02 seconds, seconds, 0.04 seconds, 0.05 seconds, 0.06 seconds, 0.07 seconds, 0.08 seconds, seconds and 0.1 second.

Step B22: introducing inert gas for purging for a second set time, and the second set time is between 20 seconds and 180 seconds, such as 20 seconds, 40 seconds, 60 seconds, 80 seconds, 100 seconds, 120 seconds, 140 seconds, 160 seconds and 180 seconds.

Step B23: introducing oxygen plasma into the chamber for a third set time, and the third set time is between 30 seconds and 180 seconds, such as 30 seconds, 45 seconds, 60 seconds, 80 seconds, 100 seconds, 125 seconds, 150 seconds and 180 seconds.

Step B24: introducing the inert gas for purging again for a fourth set time. The fourth set time is between 20 seconds and 180 seconds, such as 20 seconds, 40 seconds, 60 seconds, 80 seconds, 100 seconds, 120 seconds, 140 seconds, 160 seconds and 180 seconds.

Step B25: repeating the aforesaid steps (Step B21-Step B24) for a set number of times. The set number of times is between 50 times and 100 times, such as 50 times, 60 times, 70 times, 80 times, 90 times and 100 times.

According to the process of preparing the protective layer 13, it is prepared by the plasma enhanced atomic layer deposition system (PE-ALD). The plasma-enhanced atomic layer deposition process can be implemented at the set temperature of low temperature, which possesses the effect of protecting the performance of quantum dots.

Besides, in this embodiment, the first set time, the second set time, the third set time, and the fourth set time are coordinated to form a stable and uniform protective layer 13. The setting of the set times can be adjusted according to actual requirements. For instance, if the required thickness of the protective layer 13 is large, the set times should be appropriately increased.

In some embodiments, the protective layer 13 may also be prepared by a conventional atomic layer deposition system (ALD). Optionally, in the atomic layer deposition system at the low-temperature setting, Step B2 may comprise:

Step B2a: introducing trimethylaluminum into a chamber for a first set time. The first set time is between 0.01 second and 0.1 second, such as 0.01 second, 0.02 seconds, seconds, 0.04 seconds, 0.05 seconds, 0.06 seconds, 0.07 seconds, 0.08 seconds, seconds and 0.1 second.

Step B2b: introducing inert gas for purging for a second set time, and the second set time is between 20 seconds and 180 seconds, such as 20 seconds, 40 seconds, 60 seconds, 80 seconds, 100 seconds, 120 seconds, 140 seconds, 160 seconds and 180 seconds. Optionally, the inert gas may be nitrogen.

Step B2c: repeating the aforesaid steps (Step B2a-Step B2b) for a first set number of times. The first set number of times is between 8 times and 15 times, such as 8 times, 9 times, 10 times, 11 times, 12 times, 13 times, 14 times and 15 times.

Step B2d: introducing $H_2O$ into the chamber for a third set time. The third set time is between 0.01 second and 0.1 second, such as 0.01 second, 0.02 seconds, 0.03 seconds, 0.04 seconds, 0.05 seconds, 0.06 seconds, 0.07 seconds, 0.08 seconds, 0.09 seconds and 0.1 second.

Step B2e: introducing inert gas for purging for a fourth set time, and the fourth set time is between 20 seconds and 180 seconds, such as 20 seconds, 40 seconds, 60 seconds, 80 seconds, 100 seconds, 120 seconds, 140 seconds, 160 seconds and 180 seconds.

Step B2f: repeating the aforesaid steps (Step B2a-Step B2e) for a set number of times. The set number of times is between 50 times and 100 times, such as 50 times, 60 times, 70 times, 80 times, 90 times and 100 times.

First, Step B2a-Step B2c are proceeded, so that the substrate 11 has enough trimethylaluminum to react with the subsequent $H_2O$, reducing the risk of $H_2O$ entering the quantum dot resists 121, thereby ensuring the performance of the quantum dot resists 121.

Besides, in this embodiment, the first set time, the second set time, the third set time, and the fourth set time are coordinated to form a stable and uniform protective layer 13. The setting of the second set times can be adjusted according to actual requirements. For instance, if the required thickness of the protective layer 13 is large, the set times should be appropriately increased.

Accordingly, the manufacturing method of the display panel of this embodiment is accomplished, and the display panel 100 or the display panel 200 of the above-mentioned embodiment is obtained.

In some embodiments, please refer to FIG. 4. The manufacturing method of the display panel of this embodiment is different from the manufacturing method of the display panel of the foregoing embodiment in that the step of stripping the photoresist layer Gk is omitted, that is, the foregoing Step B105 is omitted. Then, the photoresist layer Gk is a light-transmissive photoresist layer, and the retained photoresist layer Gk comprises a plurality of photoresist bodies 123, that is, the photoresist body 123 covers the barrier 122.

Since the step of stripping the photoresist layer Gk is omitted, the risk of the stripping liquid contacting the quantum dot color resist 121 is avoided to ensure the stability of the performance of the quantum dots.

The display panel and the manufacturing method thereof provided by the embodiments of the present application are described in detail as aforementioned, and the principles and implementations of the present application have been described with reference to specific illustrations. The description of the foregoing embodiments is merely for helping to understand the technical solutions of the present application and the core ideas thereof; meanwhile, those skilled in the art will be able to change the specific embodiments and the scope of the application according to the idea of the present application. In conclusion, the content of the specification should not be construed as limiting the present application.

What is claimed is:

1. A display panel, comprising:
   a substrate;
   a color filter structure layer disposed on the substrate, and the color filter structure layer comprises a plurality of color resist units, and each of the plurality of color resist units comprises a quantum dot color resist and a barrier disposed on the quantum dot color resist;
   wherein a gap exists between barriers of two adjacent color resist units of the plurality of color resist units and quantum dot color resists of the two adjacent color resist units of the plurality of color resist units;
   wherein the display panel further comprises a protective layer, and a light-shielding layer disposed on the substrate; and the light-shielding layer is disposed between the two adjacent color resist units;
   wherein a portion of the light-shielding layer is exposed by the gap, the protective layer covers the barrier, and the protective layer is filled in the gap to attach and cover the portion of the light-shielding layer.

2. The display panel according to claim 1, wherein the color resist unit further comprises a light-transmissive photoresist body, the gap exists between light-transmissive photoresist bodies of the two adjacent color resist units of the plurality of color resist units, and the photoresist body is disposed on the barrier.

3. The display panel according to claim 1, wherein a material of the barrier comprises at least one of aluminum oxide, zinc oxide, gallium nitride, aluminum nitride and magnesium oxide; a material of the protective layer comprises at least one of aluminum oxide, zinc oxide, gallium nitride, aluminum nitride and magnesium oxide.

4. The display panel according to claim 1, further comprising a thin film transistor layer disposed on the substrate, and the color filter structure layer is disposed on the thin film transistor layer.

5. A manufacturing method of a display panel, comprising a step of:
   forming a color filter structure layer on a substrate, and the color filter structure layer comprises a plurality of color resist units, and each of the plurality of color resist units comprises a quantum dot color resist and a barrier disposed on the quantum dot color resist;
   forming a protective layer on the color filter structure layer; and
   forming a light-shielding layer on the substrate; wherein the light-shielding layer is disposed between the two adjacent color resist units;
   wherein a gap exists between barriers of two adjacent color resist units of the plurality of color resist units and quantum dot color resists of the two adjacent color resist units of the plurality of color resist units;
   wherein a portion of the light-shielding layer is exposed by the gap, the protective layer covers the barrier, and the protective layer is filled in the gap to attach and cover the portion of the light-shielding layer.

6. The manufacturing method of the display panel according to claim 5, wherein the plurality of color resist units comprises a first color resist unit and a second color resist unit, and the step of forming the color filter structure layer on the substrate comprises steps of:
   forming the first color resist unit on the substrate;
   forming the second color resist unit on the substrate;
   wherein the step of forming the first color resist unit on the substrate comprises steps of:
   forming a quantum dot material layer on the substrate;
   forming a barrier material layer on the quantum dot material layer;
   forming a patterned photoresist layer on the barrier material layer;
   removing a part of the barrier material layer and a part of the quantum dot material layer that are not covered by the photoresist layer.

7. The manufacturing method of the display panel according to claim 6, wherein after the step of removing the part of the barrier material layer and the part of the quantum dot material layer that are not covered by the photoresist layer, the manufacturing method further comprises a step of:
   removing the photoresist layer.

8. The manufacturing method of the display panel according to claim 6, wherein the step of forming a barrier material layer on the quantum dot material layer comprises a step of:
   employing an atomic layer deposition process to deposit the barrier material layer on the quantum dot material layer at a set temperature, and the set temperature is less than or equal to 60 degrees Celsius.

9. The manufacturing method of the display panel according to claim 8, wherein the step of forming a barrier material layer on the quantum dot material layer comprises a step of:
   introducing trimethylaluminum into a chamber for a first set time, and the first set time is between 0.01 second and 0.1 second;
   introducing inert gas for purging for a second set time, and the second set time is between 20 seconds and 180 seconds;
   introducing oxygen plasma into the chamber for a third set time, and the third set time is between 30 seconds and 180 seconds;
   introducing the inert gas for purging again for a fourth set time, and the fourth set time is between 20 seconds and 180 seconds;

repeating the aforesaid steps for a set number of times, and the set number of times is between 50 times and 100 times.

10. The manufacturing method of the display panel according to claim 8, wherein the step of forming a barrier material layer on the quantum dot material layer comprises a step of:

introducing trimethylaluminum into a chamber for a first set time, and the first set time is between 0.01 second and 0.1 second;

introducing inert gas for purging for a second set time, and the second set time is between 20 seconds and 180 seconds;

repeating the aforesaid steps for a first set number of times, and the first set number of times is between 8 times and 15 times;

introducing H2O into the chamber for a third set time, and the third set time is between 0.01 second and 0.1 second;

introducing the inert gas for purging again for a fourth set time, and the fourth set time is between 20 seconds and 180 seconds;

repeating the aforesaid steps for a set number of times, and the set number of times is between 50 times and 100 times.

11. The manufacturing method of the display panel according to claim 5, wherein the step of forming the protective layer on the color filter structure layer comprises a step of:

employing an atomic layer deposition process to deposit the barrier material layer on the quantum dot material layer at a set temperature, and the set temperature is less than or equal to 60 degrees Celsius; wherein the protective layer is filled in the gap.

12. The manufacturing method of the display panel according to claim 5, wherein before the step of forming the color filter structure layer on the substrate, the manufacturing method further comprises a step of:

forming a thin film transistor layer on the substrate.

13. The manufacturing method of the display panel according to claim 5, wherein a material of the barrier comprises at least one of aluminum oxide, zinc oxide, gallium nitride, aluminum nitride and magnesium oxide; a material of the protective layer comprises at least one of aluminum oxide, zinc oxide, gallium nitride, aluminum nitride and magnesium oxide.

* * * * *